US011196706B2

United States Patent
Hoarau et al.

(10) Patent No.: US 11,196,706 B2
(45) Date of Patent: Dec. 7, 2021

(54) MEDIATING CREATION AND USE OF CHANNELS OF A PUBLISH-SUBSCRIBE SERVICE

(71) Applicants: Atlassian Pty Ltd, Sydney (AU); Atlassian, Inc., San Francisco, CA (US)

(72) Inventors: Julien Hoarau, Neutral Bay (AU); Jerome Touffe-Blin, Sydney (AU); Patrick Streule, Surry Hills (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 373 days.

(21) Appl. No.: 16/413,947

(22) Filed: May 16, 2019

(65) Prior Publication Data
US 2020/0366643 A1 Nov. 19, 2020

Related U.S. Application Data

(60) Provisional application No. 62/825,411, filed on Mar. 28, 2019.

(51) Int. Cl.
*H04L 29/12* (2006.01)
*H04L 29/08* (2006.01)
*H04L 29/06* (2006.01)

(52) U.S. Cl.
CPC ......... *H04L 61/2069* (2013.01); *H04L 63/06* (2013.01); *H04L 63/08* (2013.01); *H04L 65/4076* (2013.01); *H04L 67/26* (2013.01)

(58) Field of Classification Search
None
See application file for complete search history.

(56) References Cited

U.S. PATENT DOCUMENTS

| 6,289,464 | B1 * | 9/2001 | Wecker | H04L 29/06 713/300 |
| 2018/0006835 | A1 * | 1/2018 | Li | H04L 12/1818 |
| 2018/0189303 | A1 * | 7/2018 | Mankovskii | G06Q 10/06 |

* cited by examiner

*Primary Examiner* — Robert M Morlan
(74) *Attorney, Agent, or Firm* — Brownstein Hyatt Farber Schreck, LLP (57) ABSTRACT

In one embodiment, a computer-implemented method comprises storing, in one or more data repositories, a plurality of channel records, each channel record including a channel identification (ID) and channel status indicator; receiving, at a computing device, a join request for a client account to join a channel, the join request including a first channel ID; determining whether a channel record of the plurality of channel records stored in the one or more data repositories includes a channel ID that matches the first channel ID; in response to determining that each channel record of the plurality of channel records does not include a channel ID that matches the first channel ID, creating and storing, in the one or more data repositories, a first channel record that includes: the first channel ID and a channel status indicator set to active; receiving, at the computing device, a first notification from a programmed message transport service that a channel corresponding to the first channel ID is set to inactive; in response to receiving the first notification, updating the channel status indicator of the first channel record in the one or more data repositories to indicate that the channel is inactive; receiving, at the computing device, a first request to broadcast a message to a channel corresponding to the first channel ID; in response to receiving the first request to broadcast the message to the channel corresponding to the first channel ID, determining that the channel status indicator of the first channel record is set to inactive and blocking the broadcast of the message to the programmed message transport service.

18 Claims, 7 Drawing Sheets

MEDIATING CREATION AND USE OF CHANNELS OF A PUBLISH-SUBSCRIBE SERVICE

BENEFIT CLAIM

This application claims the benefit under 35 U.S.C. § 119(e) of provisional application 62/825,411, filed Mar. 28, 2019, the entire contents of which are hereby incorporated by reference for all purposes as if fully set forth herein.

FIELD OF THE DISCLOSURE

The technical field of the present disclosure generally relates to improved methods, computer software, and/or computer hardware in the field of computer messaging, middleware and inter-process communication.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer systems have grown increasingly complex over the years. Modern applications can expect to be deployed and used across many different computer systems. These computer systems may have different operating systems (and different versions of the same operating system), different networks or network protocols, and different hardware or types of computing devices. Further, these computing systems may be located anywhere in the world. However, these applications and computing systems still expect, and need, to be able to easily communicate with other computing systems, applications, and software components. This has given rise to message oriented middleware or message bus systems.

Message oriented middleware is software or hardware that provides a layer that allows software applications or components that have been developed independently or execute on a different platforms to easily communicate in real time. By providing this middle layer, software applications or components need only be concerned about communicating with the middle layer—no concern is needed about how an intended recipient of a message will receive the message. Message oriented middleware may be accessed by a software application through an application programming interface, or other suitable methods.

Message oriented middleware includes the concept of a 'channel' which a user may subscribe to and publish messages to. When a user publishes a message to a channel, all users that are subscribed to the channel and have open connections with the channel receive the message in real time. However, channels may become inactive when all users that subscribe to the channel close their connections with the channel. Messages may be published to channels that have no active users, resulting in wasted compute resources of delivering real-time updates to inactive channels.

Improvements are needed to improve the efficiency of interfacing with message oriented middleware.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. OVERVIEW
2. EXAMPLE COMPUTER SYSTEM IMPLEMENTATION
3. EXAMPLE FUNCTIONAL IMPLEMENTATION
4. EXAMPLE CHANNEL MEDIATION IN A PUBLISH-SUBSCRIBE SERVICE
5. HARDWARE OVERVIEW
6. JOIN CHANNEL
7. PUBLISH MESSAGE
8. ACTIVE AND INACTIVE CHANNELS
9. EXTENSIONS AND ALTERNATIVES 1. Overview Computer-implemented techniques are provided for channel mediation in a publish subscribe service. In various embodiments, a computer-implemented method comprises storing, in one or more data repositories, a plurality of channel records, each channel record including a channel identification (ID) and channel status indicator; receiving, at a computing device, a join request for a client account to join a channel, the join request including a first channel ID; determining whether a channel record of the plurality of channel records stored in the one or more data repositories includes a channel ID that matches the first channel ID; in response to determining that each channel record of the plurality of channel records does not include a channel ID that matches the first channel ID, creating and storing, in the one or more data repositories, a first channel record that includes: the first channel ID and a channel status indicator set to active; receiving, at the computing device, a first notification from a programmed message transport service that a channel corresponding to the first channel ID is set to inactive; in response to receiving the first notification, updating the channel status indicator of the first channel record in the one or more data repositories to indicate that the channel is inactive; receiving, at the computing device, a first request to broadcast a message to a channel corresponding to the first channel ID; in response to receiving the first request to broadcast the message to the channel corresponding to the first channel ID, determining that the channel status indicator of the first channel record is set to inactive and blocking the broadcast of the message to the programmed message transport service.

In some embodiments, the method further comprises receiving, at the computing device, a second notification from the programmed message transport service that a channel corresponding to the first channel ID is set to active; in response to receiving the second notification, updating the channel status indicator of the first channel record in the one or more data repositories to indicate that the channel is active; receiving, at the computing device, a second request to broadcast a message to a channel corresponding to the first channel ID; in response to receiving the second request to broadcast the message to the channel corresponding to the first channel ID, determining that the channel status indicator of the first channel record is set to active and causing the broadcast of the message to the programmed message transport service.

These techniques save compute resources and network bandwidth by reducing the generation of requests to publish messages and the transmission of such messages over a network to a message transport service. Additionally, these techniques conserve compute resources at a message transport service by only publishing messages to channels when client connections to such channels are active. The techniques herein can permit processing data with fewer CPU cycles and less memory needed. Further, the techniques herein provide flexibility for channel mediation procedures to be integrated with any message transport service.

Other embodiments, aspects and features will become apparent from the disclosure as a whole.

2. Example Computer System Implementation

Figure 1:
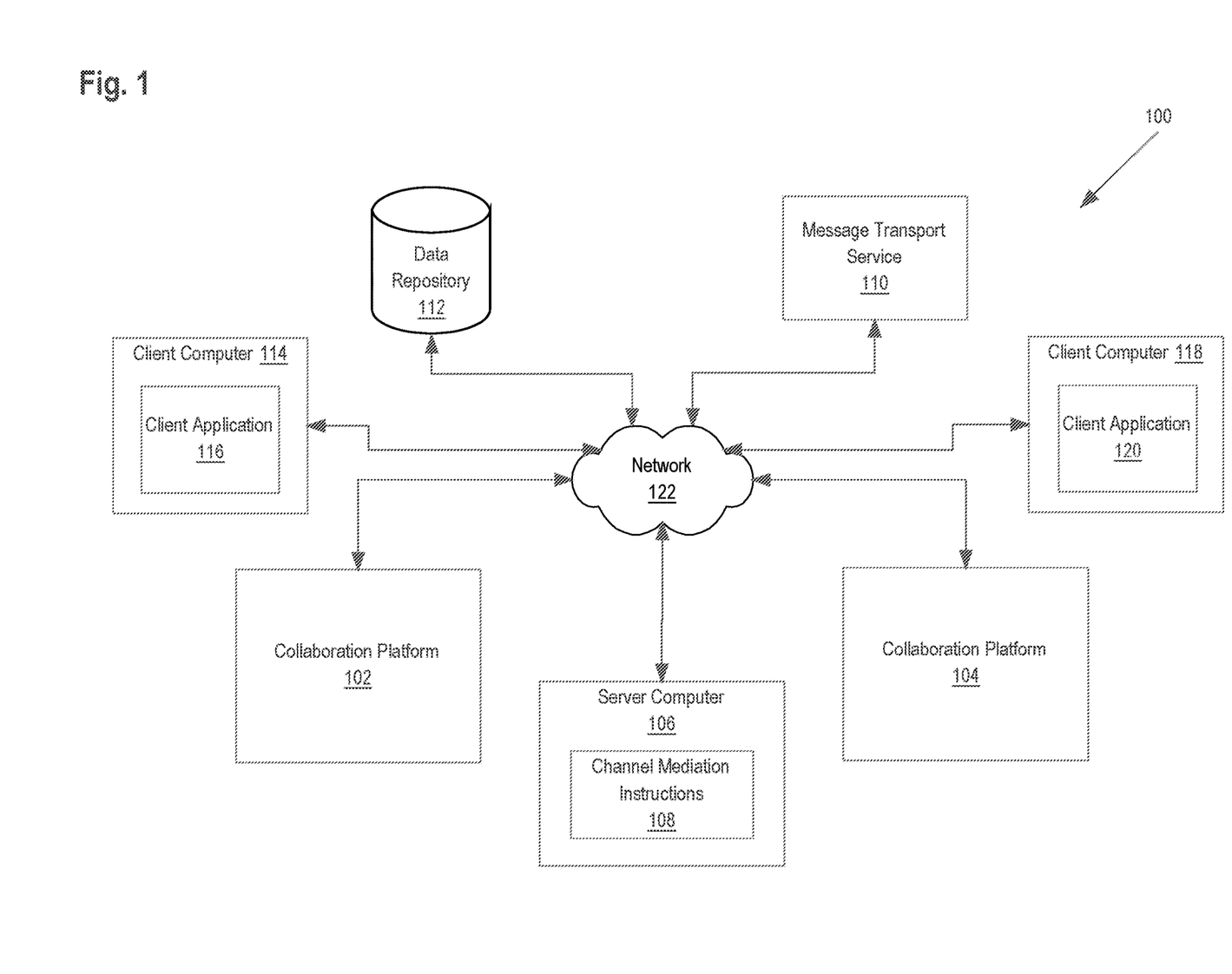
FIG. 1 illustrates an example computer system in which the techniques described herein may be practiced, in an embodiment.

FIG. 1 illustrates a system in which the techniques described may be practiced, according to one embodiment.

In one embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement The computer system 100 of FIG. 1 includes client computer 114, client computer 118, collaboration platform 102, collaboration platform 104, server computer 106, message transport service 110, data repository 112, and network 122.

Server computer 106 may comprise one or more cores, processors, computers, and/or virtual machine instances hosted on the premises of an enterprise or using a public or private cloud computing facility. Server computer 106 is communicatively connected to data repository 112, collaboration platforms 102, 104, client computers 114, 118, and message transport service 110 using any suitable wired or wireless connection, including, but not limited to: a Local Area Network (LAN), a Wide Area Network (WAN), the Internet, a company network, etc. Server computer 106 executes channel mediation instructions 108, as discussed herein, which may facilitate communication with other components of system 100. Additionally, server computer may execute additional applications (not shown) in addition to channel mediation instructions.

In one embodiment, data repository 112 may be any suitable storage device such as one or more hard disk drives, memories, or any other electronic digital data recording device configured to store data. Although data repository 112 is depicted as a single device in FIG. 1, data repository 112 may span multiple devices located in one or more physical locations. For example, data repository 112 may be one or more nodes of one or more data warehouse(s). Additionally, in one embodiment, data repository 112 may be located on the same device(s) as server computer 106. Alternatively, data repository 112 may be located on a separate device(s) from server computer 106. Additionally, data storage devices may be located on each client device associated with a computing system, such as an enterprise or work computing system. Any combination of the above may be used.

Data repository 112 may include one or more databases implemented using any suitable methodology, such as a relational database, a columnar database, etc. The database may be of any size, portioned into any number of rows, columns, or tables, and may be organized in any manner. In a multitenant embodiment, data stored on data repository 112 may relate to any number of different tenants, such as hundreds to thousands of tenants or more depending on resource capacity and throughput. The data stored on data repository 112 may relate to any type of data. Individual data records may have any number of fields, components, or other aspects.

In some embodiments, data stored in data repository 112 may include channel records. Channel records may include a channel identification (ID) and channel status indicator. A channel ID comprises a unique ID for a channel. Each channel ID may correspond to a channel in the message transport service 110. A channel status indicator may be set to 'active', indicating that a channel from the message transport service 110 corresponding to the channel ID is active, or 'inactive', indicating that a channel corresponding to the channel ID is inactive. In some embodiments, data stored in data repository 112 may include authentication keys. Authentication keys may be used by a client application to connect to and authenticate with the message transport service 110.

Collaboration platforms 102, 104 provide functions such as chat rooms, document storage, document sharing, issue tracking, and code management. Collaboration platforms 102, 104 can be deployed independently or as part of a federated system that includes collaborative document editing, media sharing, code management and issue tracking. A collaboration platform may include one or more servers and one or more data repositories. A commercially available example is JIRA issue tracking system, available from Atlassian Pty Ltd., Sydney, Australia, alone or in conjunction with the CONFLUENCE document management system and/or BITBUCKET program source code repository.

Collaboration platforms 102, 124, and client applications 116, 120 communicate with each other directly or indirectly through one or more communications networks 122. For example, client application 118 may communicate with collaboration platform 102 through a local area network (LAN) of an enterprise in one embodiment. In this case the collaboration platform 102 may be implemented as an on-premises solution in which the collaboration platform 102 and client application 116 are associated with the same business enterprise. In another embodiment, network 122 may represent a public internetwork and the collaboration platform 102 may be located off-premises with respect to an organization, such as in a shared data center or cloud computing facility. Additionally, collaboration platforms 102, 104 may communicate with server computer 106 directly or indirectly through one or more communications networks 122.

Each client application 116, 120 is a software application that accesses a collaboration server application made available by the collaboration platforms 102, 104. Each client application 116, 120 is hosted on a respective client computer 116, 118. A client computer may be any suitable device, for example a mobile device (e.g. a tablet or mobile phone), a portable device (such as laptop computer), or any other computing device (e.g. a desktop computer). A client application includes instructions and data stored in the memory (e.g. non-transient compute readable media) of the computing device on which the client application is installed/run. These instructions are executed by the processor of the computing device to perform various functions as described herein.

A client application may be implemented in various ways. For example, each client application 116, 120 may be web browser application (such as, for example, Chrome, Safari, Internet Explorer, Opera) which accesses the collaboration platforms 102, 104, server computer 106, and/or message transport service 110 via an appropriate uniform resource locator (URL) and communicates with the collaboration platforms 102, 104 via general world-wide-web protocols (e.g. HTTP, HTTPS, FTP). Each client application 116, 120 may be a specific application programmed to communicate with the collaboration platforms 102, 104, server computer 106, and/or message transport service 110 using defined application programming interface (API) calls.

A client application may be configured to generate messages, and/or publish messages by causing the broadcast of messages in real-time to other components of system 100. As described herein, a message may be generated by any source, such as a message providing process, a computing instance, applications, software components or modules, etc. A message may be formatted in any manner and may contain any type or amount of data. A message may contain multiple parts, such as a data portion and a header portion or other metadata. A message may be part of an ordered series of messages, or may be a complete, standalone message. A message may comprise an event message that indicates an action taken by a user associated with a client application. Additionally, a client application may also be configured to receive messages in real time from other components of system 100, such as message transport service.

A client application may be configured to generate requests to join channels. A client application may submit a request to join a channel by channel ID to the server computer 106. A client application may be configured to generate and submit a request to subscribe to a channel by channel ID at the message transport service 110. A client application may also be configured to open and maintain connections with the message transport service 110. While a connection is open between a client application and message transport service 110, the client application may receive messages, notifications, and updates from the message transport service whenever a message is published to a channel that the client application is subscribed to.

Message transport service 110 is software and/or hardware allows software applications or components that have been developed independently or execute on different platforms to easily communicate. Message transport service 110 may comprise a distributed service hosted by a third-party entity. Message transport service 110 may be accessed by a software application through an application programming interface, or other suitable methods. Message transport service 110 may implement a message consuming process to receive messages from a message providing process, computing instance, client applications 116, 120, server computer 106, software components or modules, etc. Message transport service 110 may implement a message providing process to provide messages to other components of system 100 via network 112.

As discussed above, message transport service 110 includes channels. Channels are how messages are sent and received. Client applications that subscribe to a channel receive messages that are published to that channel.

When an action/event associated with a channel occurs, the message transport service 110 is configured to make information associated with the action/event available to the server computer 106 and/or channel mediation instructions 108. This can be achieved in a number of different ways. As one example, and in certain embodiments, the message transport service 110 is configured to use webhooks that are triggered when an action/event associated with a channel occurs. The webhooks are designed to notify the server computer 106 and/or channel mediation instructions 108 (by way of an HTTP request to a suitable URL endpoint) of the association and provide the server computer 106 and/or channel mediation instructions 108 with details of the specific action/event. Correspondingly, the server computer 106 and/or channel mediation instructions 108 are configured to listen for communications arriving on the designated URL and store the provided information in the database.

As discussed above, the message transport service 110 may maintain open connections with client applications 116, 120. The message transport service 110 is configured to detect when a client application closes a connection with a channel. For example, if a client application has an open connection with a channel of the message transport service 110 and receives messages via a web browser chat room interface on the client application, when a user of the client application closes the web browser tab associated with the chat room interface, the message transport service detects that the client application has closed the connection with the channel.

The message transport service 110 is configured to detect that all client applications subscribed to a channel have closed their respective connections with the channel. In response, the message transport service 110 is configured to notify the server computer 106 that the channel is inactive. Additionally, the message transport service 110 is configured to detect that a channel has at least one open connection with a client application. In response, the message transport service 110 is configured to notify the server computer 106 that the channel is active.

Channel mediation instructions 108 are programmed or configured to mediate client interactivity with the message transport service 110. Channel mediation instructions 108 are programmed or configured to communicate with the message transport service 110 and client applications 116, 120 using defined application programming interface (API) calls. Channel mediation instructions 108 are programmed or configured to store and retrieve data from the data repository 112.

Specifically, channel mediation instructions 108 are programmed or configured generate channel records. Generating a channel record may comprise generating a mapping that associates channel IDs with client application components. Client application components may include containers such as specific webpages that open connections with the message transport service 110. For example, a channel record may specify that 'Page xyz' for a particular client is mapped to channel ID '12345'.

Generating a channel record may include creating a new channel ID and assigning a client application component to the new channel ID or assigning a client application component to an existing channel ID. Channel mediation instructions 108 are also configured to receive notifications from the message transport service 110 regarding whether a channel is active or inactive and, in response, update the corresponding channel records in the data repository 112. Channel mediation instructions 108 are also configured to receive message publish requests associated with a channel ID from client applications 116, 120, determine if the channel ID is set to active or inactive, and broadcast the message or event to the message transport service 110 for publishing to a channel associated with the channel ID.

In some embodiments, the channel mediation instructions 108 are programmed or configured generate authentication keys. Authentication keys may be generated when a client application requests to a join a channel. The authentication keys are then stored in the data repository. When a client application attempts to open a connection to a channel with the message transport service 110, the message transport service 110 checks that the authentication key provided by the client application has access to the channel.

3. Example Functional Implementation

Figure 2:
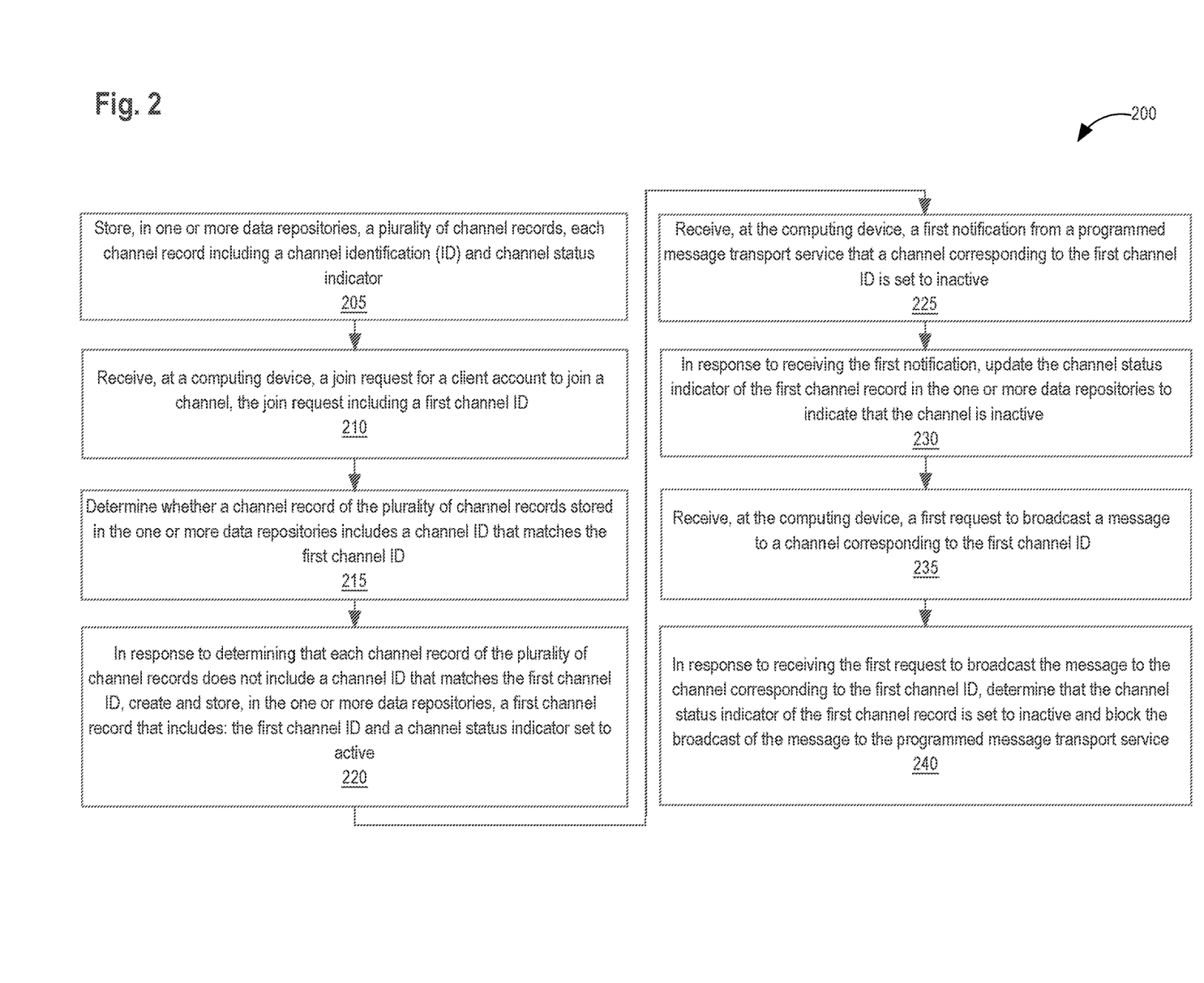
FIG. 2 illustrates a programmable algorithm or method for channel mediation in a publish-subscribe service in accordance with an embodiment.

FIG. 2 illustrates an example programmable algorithm or method for channel mediation in a publish-subscribe service. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 205, a plurality of channel records is stored in one or more data repositories. Each channel record includes a channel identification (ID) and channel status indicator.

Each channel record may correspond to a channel in the message transport service. Channel status indicators may be set to 'active', indicating that a channel from the message transport service that corresponds to the respective channel ID is an active channel that has open client connections to the channel. Channel status indicators may be set to 'inactive', indicating that a channel from the message transport service that corresponds to the respective channel ID is an inactive channel with no open client connections to the channel. For example, server computer 106 by way of channel mediation instructions 108 stores a plurality of channel records in data repository 112.

In some embodiments, each channel record includes a mapping of channel IDs to client application components. The mapping may also include a channel status indicator for the respective channel ID. Client application components may include containers such as specific webpages or URLs that open connections with the message transport service 110. For example, a channel record may specify that 'Webpage xyz' is mapped to channel ID '12345'.

In step 210, a join request for a client to join a channel is received at a computing device, the join request including a first channel ID. For example, server computer 106 receives a request to a join a channel from one of client applications 116, 120.

In step 215, it is determined whether a channel record of the plurality of channel records stored in the one or more data repositories includes a channel ID that matches the first channel ID. For example, the server computer 106 by way of the channel mediation instructions 108 may determine whether a channel record stored in the data repository 112 includes a channel ID that matches the first channel ID, for example, by querying the data repository 112 for all channel records that include a channel ID that matches the first channel ID, or by searching through the contents of the data repository 112 for matching channel records.

In step 220, in response to determining that each channel record of the plurality of channel records does not include a channel ID that matches the first channel ID, a first channel record is created and stored in the one or more data repositories that includes: the first channel ID and a channel status indicator set to active. Additionally, an authentication key is generated for the channel and stored in the one or more data repositories. A request is transmitted to a message transport service to grant the authentication key access to the channel corresponding to the first channel ID.

Once access is granted, the authentication key is transmitted to a client application. The client application may subscribe to the channel with the message transport service using the authentication key and first channel ID and open an active connection with the channel. For example, the server computer 106 by way of the channel mediation instructions 108 may determine that there are no matching channel records stored in the data repository 112 and in response, creates and stores a channel record in the data repository 112 and sets the channel status indicator of the channel record to active.

The server computer 106 then generates an authentication key and submits a grant request to the message transport service 110 that causes the message transport service to grant the authentication key access to the requested channel ID. The server computer 106 returns the authentication key to the requesting client application. The client application uses the returned authentication key and channel ID to subscribe to the channel with the message transport service 110 and thus opens an active connection with the channel.

In some embodiments, in response to determining that a particular channel record of the plurality of channel records includes a channel ID that matches the first channel ID, an authentication key is retrieved from the one or more data repositories and transmitted to a client application. The client application may subscribe to the channel with the message transport service using the authentication key and first channel ID and open an active connection with the channel.

In step 225, a first notification is received from a programmed message transport service that a channel corresponding to the first channel ID is set to inactive. For example, server computer 106 by way of channel mediation instructions 108 receives a notification from message transport service 110 that a channel is inactive.

In step 230, in response to receiving the first notification in step 225, the channel status indicator of the first channel record is updated in the one or more data repositories to indicate that the channel is inactive. For example, server computer 106 by way of channel mediation instructions 108 updates a channel record in the data repository to indicate that the channel is set to inactive.

In some embodiments, a notification may be received from a programmed message transport service that a channel ID is active. In response, the channel status indicator of the respective channel record is updated in the one or more data repositories to indicate that the channel is active.

In step 235 a first request to broadcast a message to a channel corresponding to the first channel ID is received. For example, server computer 106 by way of channel mediation instructions 108 receives a request to broadcast a message to a channel from one of the client applications 116, 120.

In step 240, in response to receiving the first request to broadcast the message to the channel corresponding to the first channel ID in step 235, it is determined that the channel status indicator of the first channel record is set to inactive. Once it is determined that the channel status indicator of the first channel record is set to inactive, the broadcast of the message to the programmed message transport service is blocked. The broadcast of the message is 'blocked in a sense that the message is not broadcasted to the channel corresponding to the first channel ID of the message transport service when the channel status indicator of the first channel is set to inactive. Blocking the broadcast of a message may comprise branching away from executable code that otherwise would cause the broadcast of the message.

In some embodiments, if it is determined that the channel status indicator of the channel record corresponding to the first channel ID is set to inactive, server computer 106 continuously monitors the data repository 112 for a change to the channel status indicator. The broadcast of the message is blocked until the server computer 106 identifies a change in state of the channel status indicator to 'active'. During this time period, the message may be held in a queue at the server computer 106 or data repository 112. Once the server computer 106 identifies that the channel status indicator has been changed to 'active', the message is broadcasted to the programmed message transport service.

Alternatively, it may be determined that the channel status indicator of the first channel record is set to active. Once it is determined that the channel status indicator of the first channel record is set to active, the message is broadcasted to the programmed message transport service. For example, the server computer 106 by way of the channel mediation instructions 108 may determine whether a channel status indicator of a channel record stored in the data repository 112 is set to active or inactive, for example, by querying the data repository 112 for the channel status indicator value of a channel that corresponds to a channel ID.

Using this procedure, a publish-subscribe service may provide robust channel mediation without unnecessary overhead. In particular, the invention provides consistency and durability of the ACID (Atomicity, Consistency, Isolation, and Durability) properties. By reducing the overhead associated with publishing messages to inactive channels, network costs including bandwidth expenditures are reduced, compute costs are conserved, and the effectiveness and usability of the message transport service is increased. The techniques herein can permit processing data with fewer CPU cycles and less memory needed.

4. Example Channel Mediation in a Publish-Subscribe Service

Figure 3:
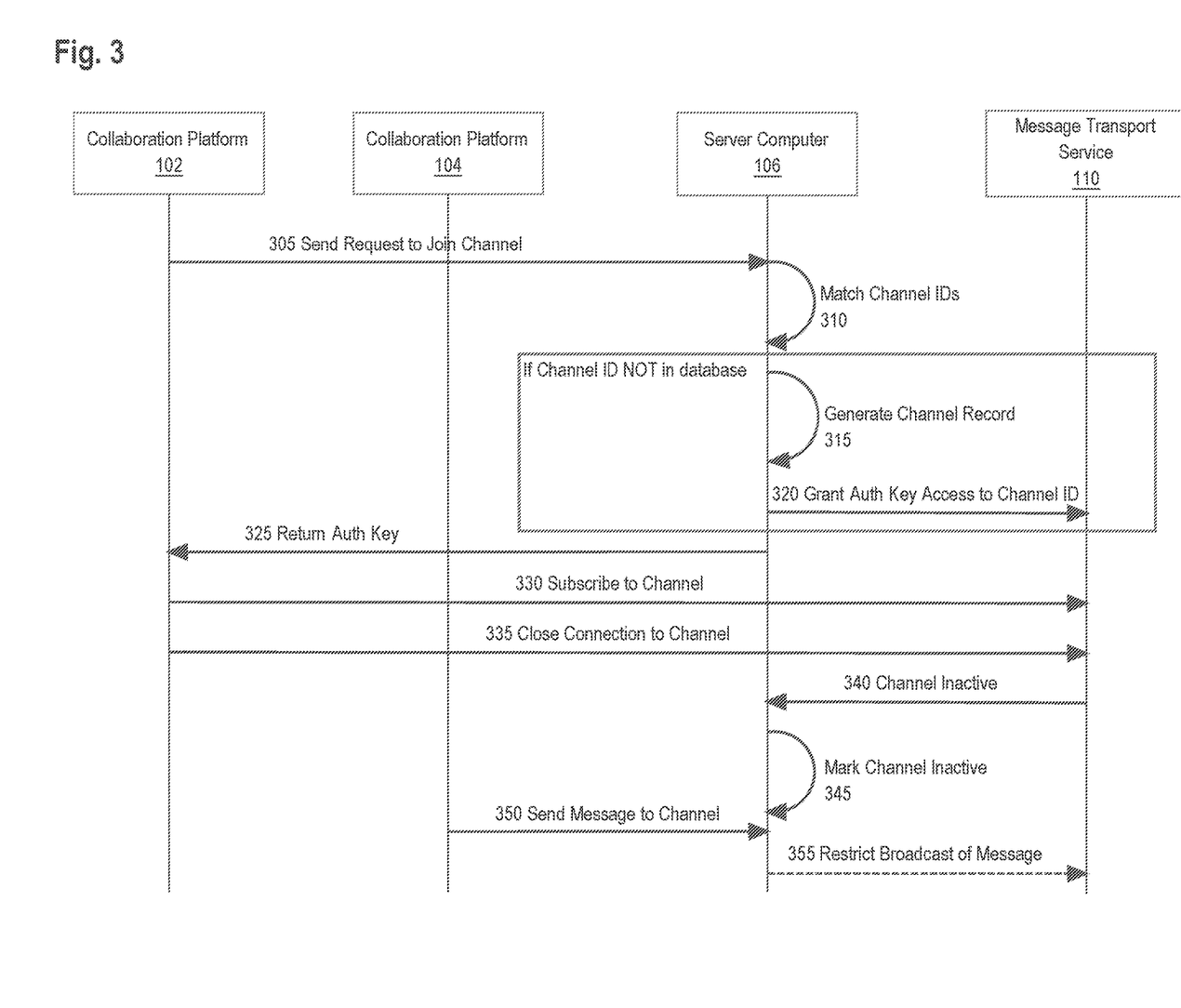
FIG. 3 illustrates an example of channel mediation in a publish-subscribe service.

FIG. 3 illustrates an example of channel mediation in a publish-subscribe service accordance with an embodiment. In FIG. 3, collaboration platform 102, collaboration platform 104, server computer 106, and message transport service 110 are shown.

To begin, at 305 the collaboration platform 102 sends a request to join a channel to server computer 106. The request includes a channel ID that specifies which channel to join. At 310, server computer 106 receives the join request with the channel ID and queries the data repository (not shown) to determine if any channel records in the repository have a matching channel ID. If no channel records in the repository have a matching channel ID, at 315 the server computer 106 generates a channel record with the requested channel ID and sets the channel status indicator of the channel record to 'active' in the repository.

At 320 the server computer 106 generates an authentication key and submits a grant request to the message transport service 110 that causes the message transport service to grant the authentication key access to the requested channel ID. At 325 the server computer 106 returns the authentication key to collaboration platform 102. At 330 collaboration platform 102 uses the returned authentication key and channel ID to subscribe to the channel with the message transport service 110 and opens an active connection with the channel.

At 335 the collaboration platform 102 closes the connection with the channel at the message transport service 110. In response, at 340 the message transport service 110 sends a notification to the server computer 106 that the channel corresponding to the channel ID is inactive. At 345 the server computer 106 sets the channel status indicator of the channel record with the channel ID to 'inactive' in the repository.

At 350, collaboration platform 104 sends a publish message request to server computer 106 that specifies the channel ID to publish the message to. At 335, after determining that the channel status indicator associated with the channel ID is set to inactive in the repository, the server computer 106 blocks the broadcast of the message. In this example, blocking the broadcast of the message includes not transmitting the message to the message transport service 110. Alternatively, blocking the broadcast of the message includes the server computer waiting until the channel status indicator associated with the channel ID is set to 'active' in the repository to broadcast the message to the message transport service 110.

Thus, a publish-subscribe service may provide robust channel mediation without unnecessary overhead. Channel mediation techniques discussed herein ensure that messages are not published to inactive channels at a message transport service. These techniques save compute resources and network bandwidth by reducing the generation of requests to publish messages and the transmission of such messages over a network to a message transport service. Additionally, these techniques conserve compute resources at a message transport service by only publishing messages to channels when client connections to such channels are active. The techniques herein can permit processing data with fewer CPU cycles and less memory needed. Further, the techniques herein provide flexibility for channel mediation procedures to be integrated with any message transport service.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 4:
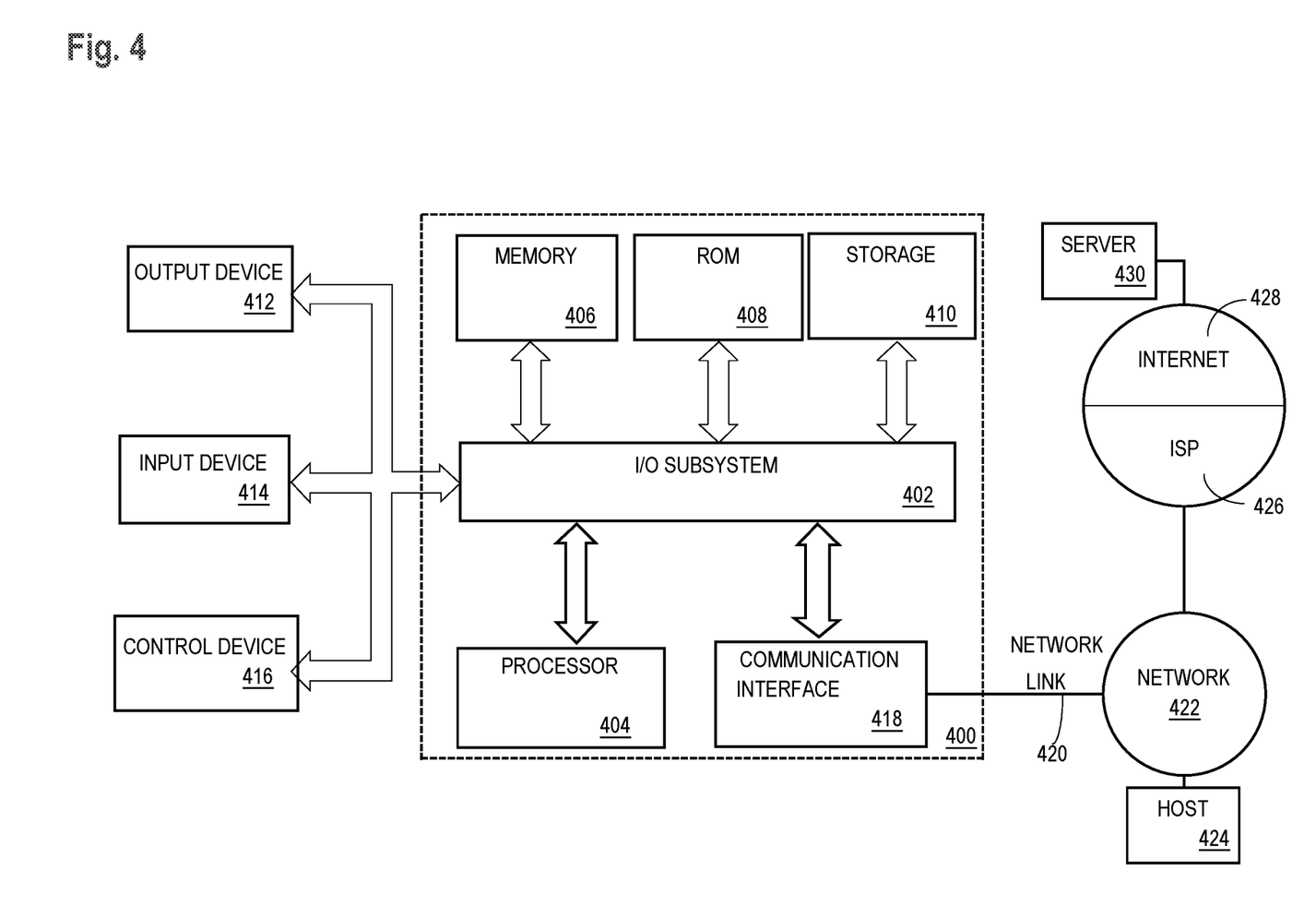
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and stored in storage device 410, or other non-volatile storage for later execution.

6. Join Channel

Figure 5A:
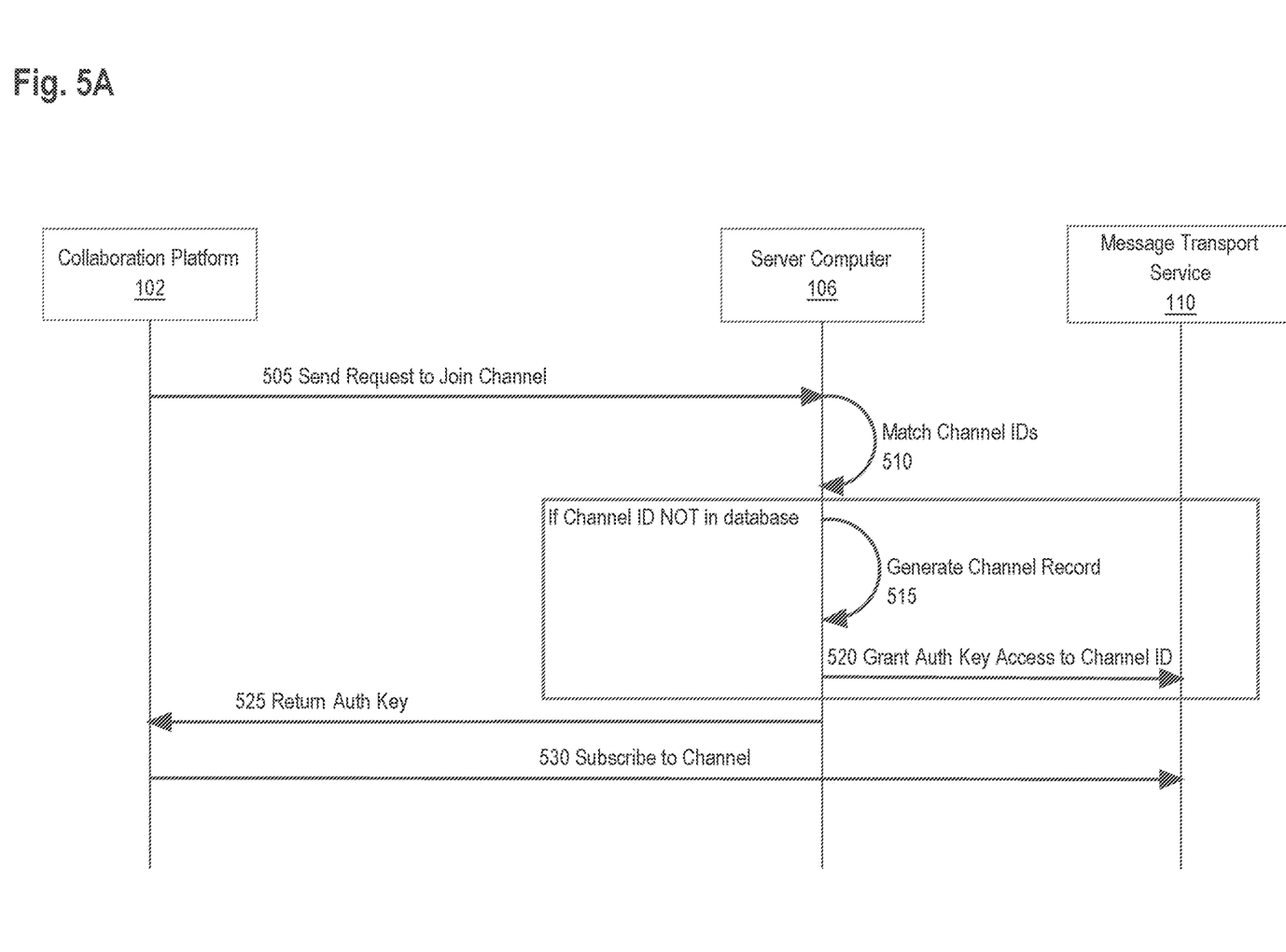
FIG. 5A illustrates an example flow for joining a channel.

FIG. 5A illustrates an example flow for joining a channel. In FIG. 5A, collaboration platform 102, server computer 106, and message transport service 110 as described with respect to FIG. 1 are shown.

To begin, a user may submit a request to a client application, e.g. Stride, to join a conversation that exists within the client application. The client application receives the request and translates the request into a join container request. The join container request is sent to the collaboration platform 102. At step 505, based on the join container request, the collaboration platform 102 sends a request to join a channel to server computer 106. The request may include a channel ID that specifies a channel to join. At step 510, the server computer 106 receives the join request with the channel ID and queries a data repository, e.g. Dynamo DB, to determine if any channel records in the repository have a matching channel ID. The query or request may also include a request for channel data such as an authentication key, number of subscribed channels, channel names, and channel subscribe dates. At step 515, if the server computer 106 determines that no channel records in the repository have a matching channel ID, the server computer 106 generates a channel record with the requested channel ID, generates an authentication key for the user and channel at step 520, grants the authentication key access to the channel by calling a grant API endpoint at the message transport service 110, sets the channel status indicator of the channel record to 'active' in the repository, and saves user channel data in the repository such as the new channel name and subscribe date. At step 525, the server computer 106 returns the authentication key, channel name(s), and subscribe key to the collaboration platform 102. At step 520, the collaboration platform 102 directly subscribes to the channel(s) at the message transport service 110 using the channel ID and authentication key. When subscribing to a channel, a connection is opened between the message transport service 110 and client application.

7. Publish Message

Figure 5B:
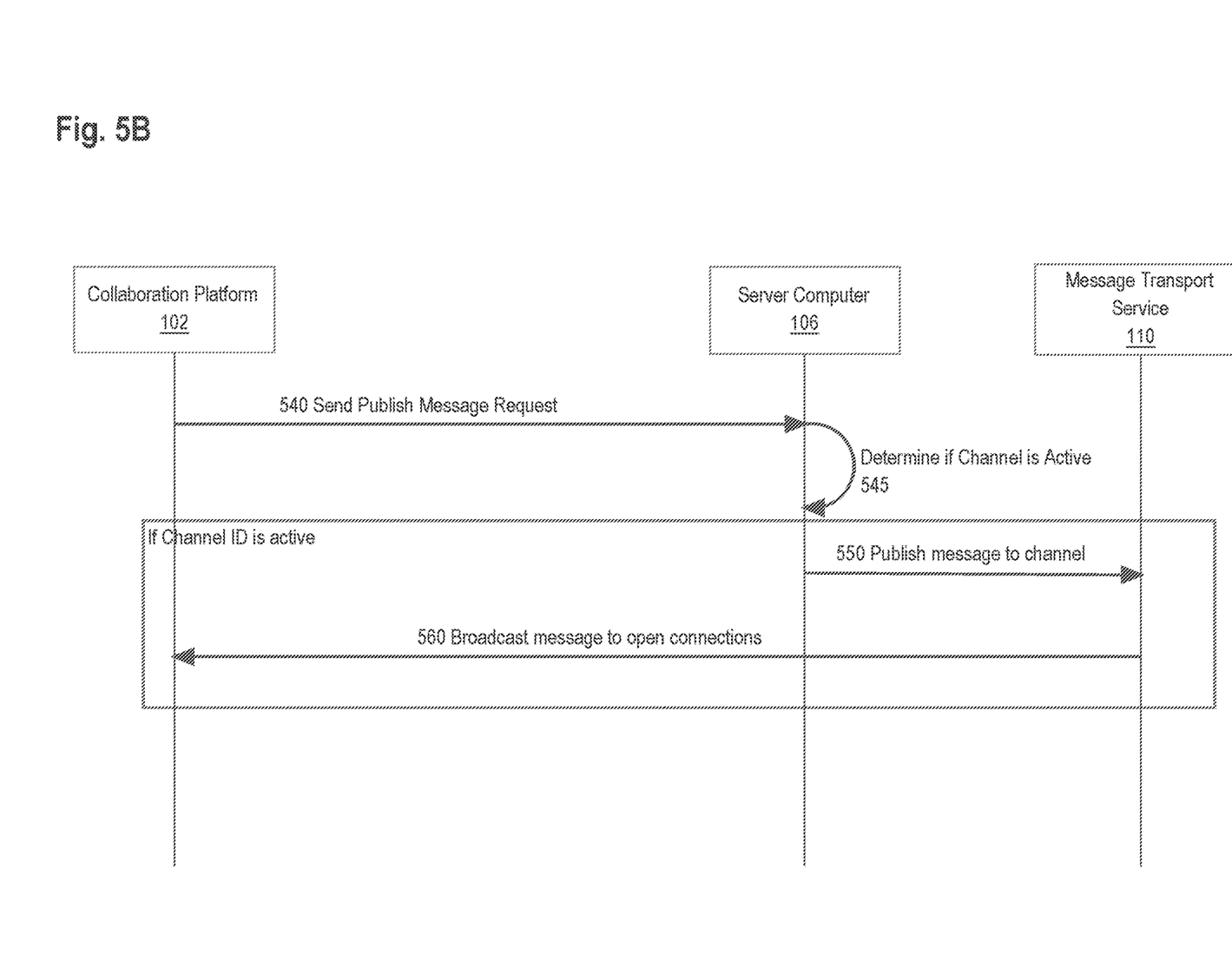
FIG. 5B illustrates an example flow for publishing a message to a channel.

FIG. 5B illustrates an example flow for publishing a message to a channel. In FIG. 5B, collaboration platform 102, server computer 106, and message transport service 110 as described with respect to FIG. 1 are shown.

To begin, at step 540, collaboration platform 102 sends a publish message request to server computer 106 that specifies the channel ID to publish the message to. After determining that the channel status indicator associated with the channel ID is set to active at step 545, the server computer 106 publishes or broadcasts the message to the channel at the message transport service 110 that corresponds to the channel ID. At step 560, the message transport service 110 transmits the message to every user client application that has an open connection with the channel, some of which may have open connections via collaboration platform 102.

Alternatively, if it is determined that the channel status indicator associated with the channel ID is set to active inactive in the repository, the server computer 106 blocks the broadcast of the message. In this example, blocking the broadcast of the message includes not transmitting the message to the message transport service. Alternatively, blocking the broadcast of the message includes the server computer waiting until the channel status indicator associated with the channel ID is set to 'active' in the repository to broadcast the message to the message transport service.

8. Active and Inactive Channels

Figure 6A:
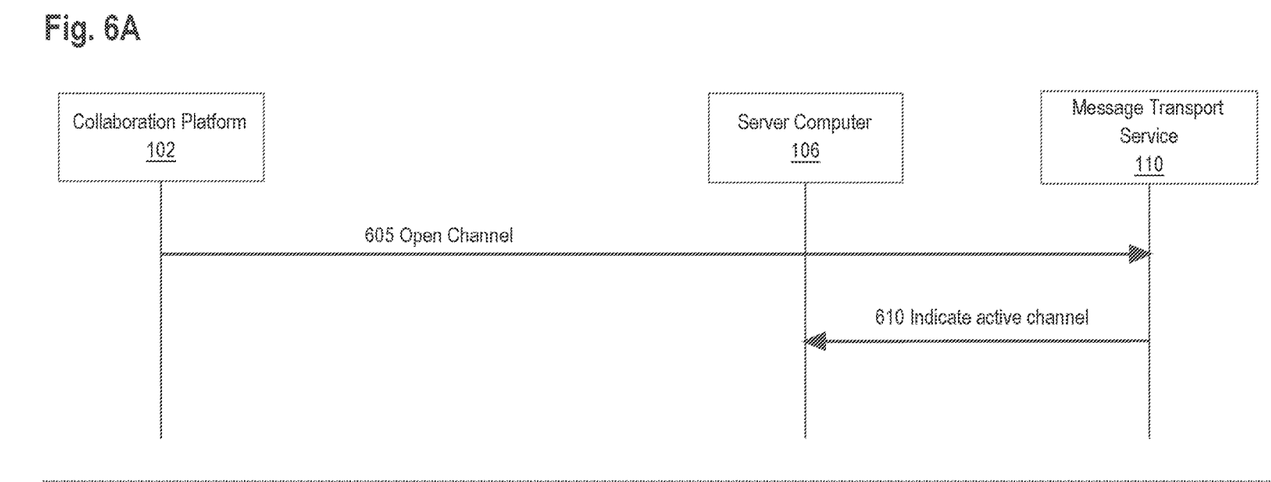
FIG. 6A illustrates an example flow for marking a channel as active.

FIG. 6A illustrates an example flow for marking a channel as active. In FIG. 6A, collaboration platform 102, server computer 106, and message transport service 110 as described with respect to FIG. 1 are shown. At step 605, a user opens a connection with a channel at the message transport service 110 by subscribing to a new channel or opening a container associated with the collaboration platform 102 that connects to the channel at the message transport service 110. In response, at step 610, the message transport service 110 sends a notification to the server computer 106 that the channel corresponding to the channel ID is active. The server computer 106 sets the channel status indicator of the channel record with the channel ID to 'active' in a data repository accessible by the server computer 106.

Figure 6B:
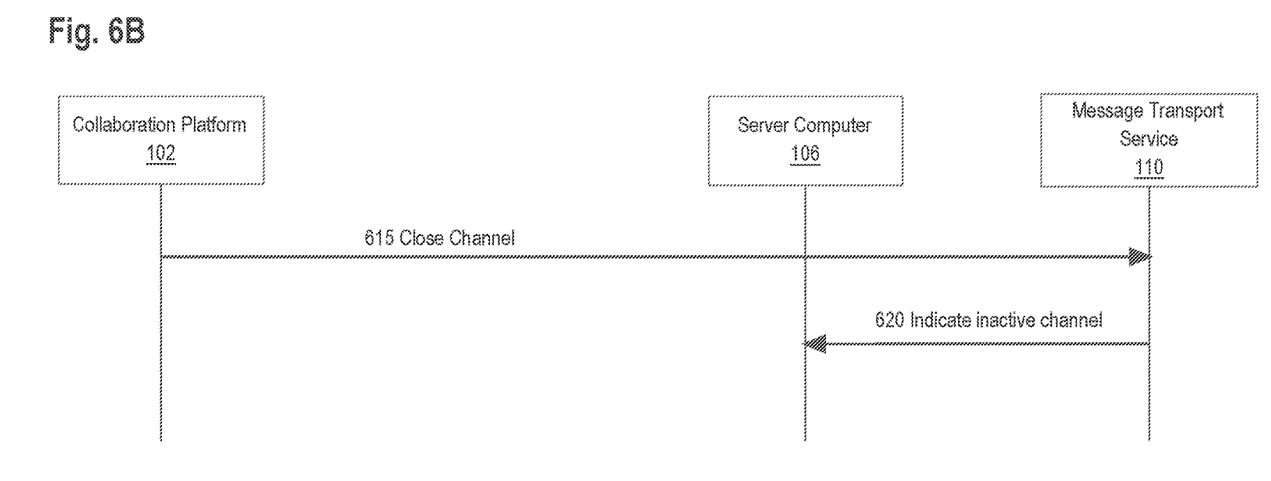
FIG. 6B illustrates an example flow for marking a channel as inactive.

FIG. 6B illustrates an example flow for marking a channel as inactive. In FIG. 6B, collaboration platform 102, server computer 106, and message transport service 110 as described with respect to FIG. 1 are shown. At step 615, a user who has an open connection with a channel at the message transport 110 service closes the connection with the channel at the message transport service 110. This may occur, for example, by the user closing a client application such as the collaboration platform 102 which has an open connection with message transport service 110. At step 620, the message transport service 110 sends a notification to the server computer 106 that the channel corresponding to the channel ID is inactive. The server computer 106 sets the channel status indicator of the channel record with the channel ID to 'inactive' in in a data repository accessible by the server computer 106.

9. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented data processing method comprising:
    storing, in one or more data repositories, a plurality of channel records, each channel record including a channel identification (ID) and channel status indicator;
    receiving, at a computing device, a join request for a client account to join a channel, the join request including a first channel ID;
    determining whether a channel record of the plurality of channel records stored in the one or more data repositories includes a channel ID that matches the first channel ID;
    in response to determining that each channel record of the plurality of channel records does not include a channel ID that matches the first channel ID, creating and storing, in the one or more data repositories, a first channel record that includes: the first channel ID and a channel status indicator set to active;
    receiving, at the computing device, a first notification from a programmed message transport service that a channel corresponding to the first channel ID is set to inactive;
    in response to receiving the first notification, updating the channel status indicator of the first channel record in the one or more data repositories to indicate that the channel is inactive;
    receiving, at the computing device, a first request to broadcast a message to a channel corresponding to the first channel ID;
    in response to receiving the first request to broadcast the message to the channel corresponding to the first channel ID, determining that the channel status indicator of the first channel record is set to inactive and blocking the broadcast of the message to the programmed message transport service.

2. The method of claim 1, further comprising:
    in response to determining that each channel record of the plurality of channel records does not include a channel ID that matches the first channel ID, creating and storing, in the one or more data repositories, a first authentication key that includes user authentication data for a channel in the programmed message transport service associated with the first channel record;
    in response to determining that the channel status indicator of the first channel record is set to inactive, blocking the broadcast of the first authentication key to the programmed message transport service.

3. The method of claim 1, wherein the channel status indicator set to active indicates that a respective channel in the programmed message transport service includes at least one open connection.

4. The method of claim 1, wherein the channel status indicator set to inactive indicates that a respective channel in the programmed message transport service includes no open connections.

5. The method of claim 1, further comprising:
    receiving, at the computing device, a second notification from the programmed message transport service that a channel corresponding to the first channel ID is set to active;
    in response to receiving the second notification, updating the channel status indicator of the first channel record in the one or more data repositories to indicate that the channel is active;
    receiving, at the computing device, a second request to broadcast a message to a channel corresponding to the first channel ID;
    in response to receiving the second request to broadcast the message to the channel corresponding to the first channel ID, determining that the channel status indicator of the first channel record is set to active and causing the broadcast of the message to the programmed message transport service.

6. The method of claim 5, further comprising:
    in response to determining that each channel record of the plurality of channel records does not include a channel ID that matches the first channel ID, creating and storing, in the one or more data repositories, a first authentication key that includes user authentication data for a channel in the programmed message transport service associated with the first channel record;
    in response to determining that the channel status indicator of the first channel record is set to active, causing the broadcast of the first authentication key to the programmed message transport service.

7. A computer system comprising:
    one or more processors;
    one or more memories storing instructions which, when executed by the one or more processors, cause the one or more processors to perform:
    storing, in one or more data repositories, a plurality of channel records, each channel record including a channel identification (ID) and channel status indicator;
    receiving, at a computing device, a join request for a client account to join a channel, the join request including a first channel ID;
    determining whether a channel record of the plurality of channel records stored in the one or more data repositories includes a channel ID that matches the first channel ID;
    in response to determining that each channel record of the plurality of channel records does not include a channel ID that matches the first channel ID, creating and storing, in the one or more data repositories, a first channel record that includes: the first channel ID and a channel status indicator set to active;
    receiving, at the computing device, a first notification from a programmed message transport service that a channel corresponding to the first channel ID is set to inactive;
    in response to receiving the first notification, updating the channel status indicator of the first channel record in the one or more data repositories to indicate that the channel is inactive;
    receiving, at the computing device, a first request to broadcast a message to a channel corresponding to the first channel ID;
    in response to receiving the first request to broadcast the message to the channel corresponding to the first channel ID, determining that the channel status indicator of the first channel record is set to inactive and blocking the broadcast of the message to the programmed message transport service.

8. The system of claim 7, further comprising:
    in response to determining that each channel record of the plurality of channel records does not include a channel ID that matches the first channel ID, creating and storing, in the one or more data repositories, a first authentication key that includes user authentication data for a channel in the programmed message transport service associated with the first channel record;

in response to determining that the channel status indicator of the first channel record is set to inactive, blocking the broadcast of the first authentication key to the programmed message transport service.

9. The system of claim 7, wherein the channel status indicator set to active indicates that a respective channel in the programmed message transport service includes at least one open connection.

10. The system of claim 7, wherein the channel status indicator set to inactive indicates that a respective channel in the programmed message transport service includes no open connections.

11. The system of claim 7, further comprising:
receiving, at the computing device, a second notification from the programmed message transport service that a channel corresponding to the first channel ID is set to active;
in response to receiving the second notification, updating the channel status indicator of the first channel record in the one or more data repositories to indicate that the channel is active;
receiving, at the computing device, a second request to broadcast a message to a channel corresponding to the first channel ID;
in response to receiving the second request to broadcast the message to the channel corresponding to the first channel ID, determining that the channel status indicator of the first channel record is set to active and causing the broadcast of the message to the programmed message transport service.

12. The system of claim 11, further comprising:
in response to determining that each channel record of the plurality of channel records does not include a channel ID that matches the first channel ID, creating and storing, in the one or more data repositories, a first authentication key that includes user authentication data for a channel in the programmed message transport service associated with the first channel record;
in response to determining that the channel status indicator of the first channel record is set to active, causing the broadcast of the first authentication key to the programmed message transport service.

13. One or more non-transitory computer readable media storing one or more sequences of instructions which, when executed by one or more processors, cause:
storing, in one or more data repositories, a plurality of channel records, each channel record including a channel identification (ID) and channel status indicator;
receiving, at a computing device, a join request for a client account to join a channel, the join request including a first channel ID;
determining whether a channel record of the plurality of channel records stored in the one or more data repositories includes a channel ID that matches the first channel ID;
in response to determining that each channel record of the plurality of channel records does not include a channel ID that matches the first channel ID, creating and storing, in the one or more data repositories, a first channel record that includes: the first channel ID and a channel status indicator set to active;
receiving, at the computing device, a first notification from a programmed message transport service that a channel corresponding to the first channel ID is set to inactive;

in response to receiving the first notification, updating the channel status indicator of the first channel record in the one or more data repositories to indicate that the channel is inactive;
receiving, at the computing device, a first request to broadcast a message to a channel corresponding to the first channel ID;
in response to receiving the first request to broadcast the message to the channel corresponding to the first channel ID, determining that the channel status indicator of the first channel record is set to inactive and blocking the broadcast of the message to the programmed message transport service.

14. The one or more non-transitory computer readable media of claim 13, the sequences of instructions including instructions that, when executed by the one or more processors, cause:
in response to determining that each channel record of the plurality of channel records does not include a channel ID that matches the first channel ID, creating and storing, in the one or more data repositories, a first authentication key that includes user authentication data for a channel in the programmed message transport service associated with the first channel record;
in response to determining that the channel status indicator of the first channel record is set to inactive, blocking the broadcast of the first authentication key to the programmed message transport service.

15. The one or more non-transitory computer readable media of claim 13, wherein the channel status indicator set to active indicates that a respective channel in the programmed message transport service includes at least one open connection.

16. The one or more non-transitory computer readable media of claim 13, wherein the channel status indicator set to inactive indicates that a respective channel in the programmed message transport service includes no open connections.

17. The one or more non-transitory computer readable media of claim 13, the sequences of instructions including instructions that, when executed by the one or more processors, cause:
receiving, at the computing device, a second notification from the programmed message transport service that a channel corresponding to the first channel ID is set to active;
in response to receiving the second notification, updating the channel status indicator of the first channel record in the one or more data repositories to indicate that the channel is active;
receiving, at the computing device, a second request to broadcast a message to a channel corresponding to the first channel ID;
in response to receiving the second request to broadcast the message to the channel corresponding to the first channel ID, determining that the channel status indicator of the first channel record is set to active and causing the broadcast of the message to the programmed message transport service.

18. The one or more non-transitory computer readable media of claim 17, the sequences of instructions including instructions that, when executed by the one or more processors, cause:
in response to determining that each channel record of the plurality of channel records does not include a channel ID that matches the first channel ID, creating and storing, in the one or more data repositories, a first authentication key that includes user authentication data for a channel in the programmed message transport service associated with the first channel record;

in response to determining that the channel status indicator of the first channel record is set to active, causing the broadcast of the first authentication key to the programmed message transport service.

\* \* \* \* \*